United States Patent
Khodorkovsky et al.

(10) Patent No.: US 8,316,255 B2
(45) Date of Patent: Nov. 20, 2012

(54) METHOD AND APPARATUS FOR RESPONDING TO SIGNALS FROM A DISABLING DEVICE WHILE IN A DISABLED STATE

(75) Inventors: Oleksandr Khodorkovsky, Toronto (CA); Ali Ibrahim, Oakland, CA (US); Phil Mummah, Palo Alto, CA (US)

(73) Assignee: ATI Technologies ULC, Markham, Ontario (CA)

( * ) Notice: Subject to any disclaimer, the term of this patent is extended or adjusted under 35 U.S.C. 154(b) by 283 days.

(21) Appl. No.: 12/713,935

(22) Filed: Feb. 26, 2010

(65) Prior Publication Data

US 2011/0060928 A1    Mar. 10, 2011

Related U.S. Application Data

(60) Provisional application No. 61/240,876, filed on Sep. 9, 2009.

(51) Int. Cl.
  *G06F 1/00* (2006.01)
(52) U.S. Cl. ......... 713/324; 713/300; 713/320; 713/323
(58) Field of Classification Search .................. 713/300, 713/320, 323, 324; 710/15, 17
  See application file for complete search history.

(56) References Cited

U.S. PATENT DOCUMENTS

| | | | | |
|---|---|---|---|---|
| 5,848,281 | A * | 12/1998 | Smalley et al. | 713/322 |
| 6,131,167 | A | 10/2000 | Cruz | |
| 6,618,791 | B1 * | 9/2003 | Dodd et al. | 711/105 |
| 7,636,863 | B2 * | 12/2009 | Oh | 713/320 |
| 7,890,780 | B2 * | 2/2011 | Golasky et al. | 713/300 |
| 8,161,304 | B2 * | 4/2012 | Hamilton | 713/320 |
| 2005/0250452 | A1 * | 11/2005 | Walton et al. | 455/63.4 |
| 2008/0235527 | A1 * | 9/2008 | Heller et al. | 713/320 |
| 2009/0063791 | A1 | 3/2009 | Cho | |
| 2009/0204831 | A1 | 8/2009 | Cousson | |
| 2010/0064160 | A1 * | 3/2010 | Wilson et al. | 713/324 |
| 2010/0218011 | A1 * | 8/2010 | Diab et al. | 713/310 |

FOREIGN PATENT DOCUMENTS

| | | |
|---|---|---|
| EP | 2 079 015 A1 | 7/2009 |
| WO | WO 00/65428 A1 | 11/2000 |
| WO | WO 2007/140404 A2 | 12/2007 |
| WO | WO 2009/038902 A1 | 3/2009 |

OTHER PUBLICATIONS

Search Report and Written Opinion for International Application No. PCT/US2010/048096 mailed Dec. 29, 2010, 14 pages.

* cited by examiner

*Primary Examiner* — Jaweed A Abbaszadeh (74) *Attorney, Agent, or Firm* — Sterne, Kessler, Goldstein & Fox P.L.L.C.

(57) ABSTRACT

A method of operating a device is provided. The method includes transitioning the GPU to a substantially disabled state in response to a first received signal, and generating, while the GPU is in the substantially disabled state, a response signal in response to a second received signal. The response signal is substantially similar to a second response signal that would be generated by the GPU in a powered state in response to the second received signal.

21 Claims, 10 Drawing Sheets

METHOD AND APPARATUS FOR RESPONDING TO SIGNALS FROM A DISABLING DEVICE WHILE IN A DISABLED STATE

CROSS REFERENCE TO RELATED APPLICATIONS

This application claims the benefit of U.S. Provisional Appl. No. 61/240,876, filed Sep. 9, 2009, which is incorporated by reference herein in its entirety.

BACKGROUND OF THE INVENTION

1. Field of the Invention

The present invention is related to multiprocessing systems, and more particularly to saving power in multi-processor systems.

2. Background

Some processing systems include multiple processing units (such as, for example, multiple graphics processing units—GPUs) to allow for performance gains through parallel processing of tasks. Exemplary tasks may include, for example, video processing, graphics processing, physics simulations and the like. A graphics-intensive game may be running that requires or can benefit from having the additional processing power provided by multiple active GPUs. Other applications, however, do not benefit from such increased processing power. When these applications are being run, less graphics processing power is necessary. This can be accomplished by reducing the number or GPUs or by switching from one GPU to another with lower capabilities.

GPUs are typically coupled to a central processing unit (CPU) through a bus, e.g., a peripheral component interconnect (PCI) or PCI express bus and may be included in another device (e.g., a northbridge device). Alternatively, a GPU or other type of core or processor may be included as part of the same package or same die as a CPU An operating system, running on a CPU, usually generates configuration cycles. When a device does not respond to the configuration cycles, e.g., when the device is turned off, the operating system can cause complex processes (e.g., plug-and-play processes) to be executed that can have negative effects on the user experience. Thus, powering on and off devices is often operating system dependent. To prevent these negative effects, many graphics systems keep GPUs powered (even those that are not being used) so that they can respond to configuration cycles generated by the CPU. Keeping unused GPUs powered, however, can result in inefficient power usage and, in mobile systems, decreased battery life.

What is needed, then, are methods and systems that allow processors to be placed in reduced-power states without conflicting with system behavior or limitations, e.g. by responding to bus configuration cycles while the device is turned off.

BRIEF SUMMARY

Embodiments described herein generally relate to transitioning the power state of a device in response to a first signal and generating a response signal to a second signal that is substantially similar to a response signal that would be generated if the device was in a powered state. For example, a GPU can be transitioned to a substantially disabled state or a powered state based on the responsibilities assigned to it.

In an embodiment, a method of operating a device includes transitioning the device to a substantially disabled state in response to a first received signal, and generating, while the device is in the substantially disabled state, a response signal in response to a second received signal. The response signal is substantially similar to a second response signal that would be generated by the device in a powered state in response to the second received signal.

In another embodiment, a device includes a bus interface module. The bus interface module includes a state management module configured to control a power state of the device and a response module configured to generate a response signal in response to a received signal. The bus interface module is coupled to a power system configured to supply power to the bus interface module when the device is in a substantially disabled state. Thus, the response module is able to generate the response signal when the processor is in the low power state.

In another embodiment, a computer readable medium is provided that carries one or more sequences of one or more instructions for execution by one or more processors to perform a method for operating a device, the instructions when executed by the one or more processors, cause the one or more processors to transition the device to a substantially disabled state in response to a first received signal, and generate a response signal in response to a second received signal while the device is in the substantially disabled state. The response signal is substantially similar to a second response signal that would be generated by the device in a powered state in response to the second received signal.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1:
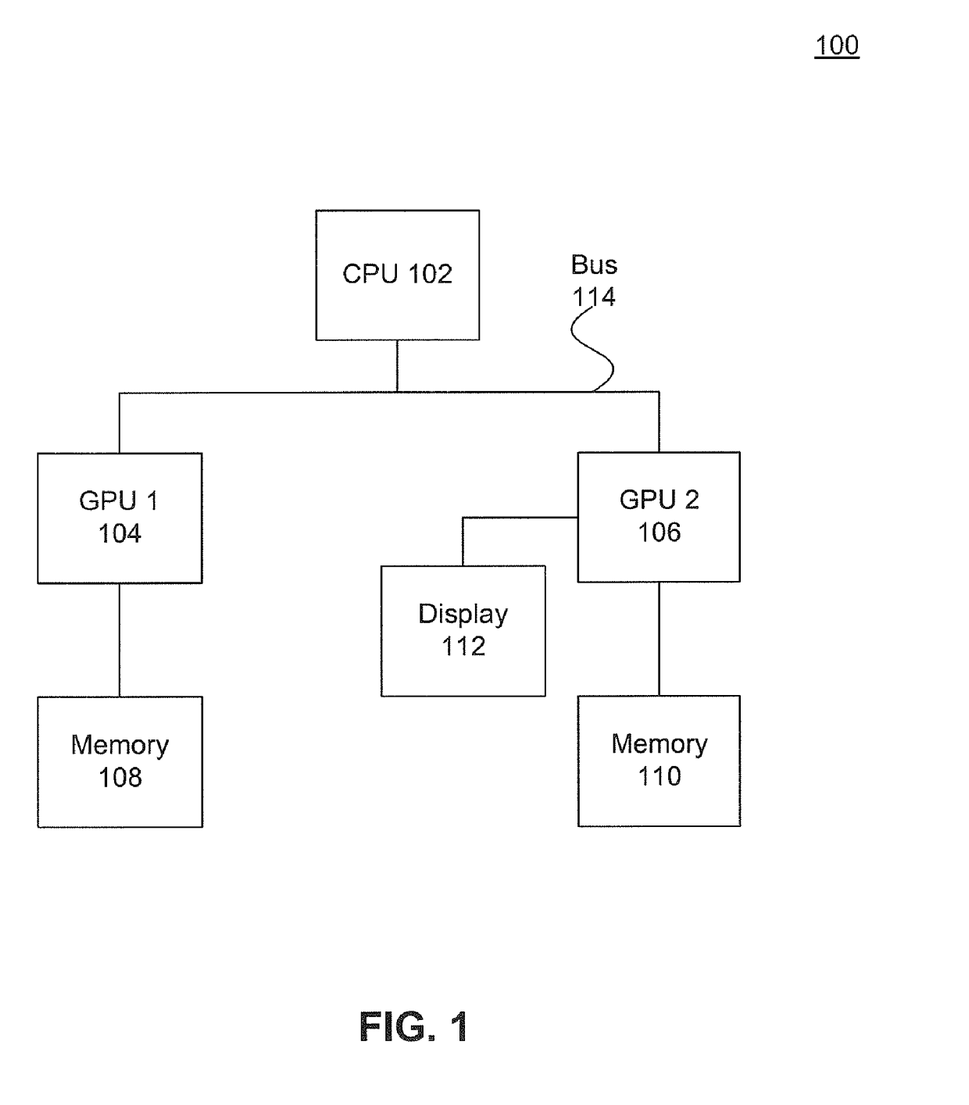
FIG. 1 shows a block diagram of a conventional computing environment.

FIG. 1 is a block diagram illustration of a computing environment 100. Computing environment 100 includes central processing unit 102, first and second graphics processing units (GPUs) 104 and 106, memories 108 and 110, and a display 112.

CPU 102 is coupled to first and second GPUs 104 and 106 through a bus 114. In an embodiment of the present invention, bus 114 is a peripheral component interconnect (PCI) bus, e.g., a PCI express bus. First and second GPUs 104 and 106 complete graphics tasks. For example, first GPU 104 and/or second GPU 106 can complete rendering, display, or other tasks assigned to them by CPU 102. Moreover, first and second GPUs 104 and 106 can have different roles. For example, second GPU 106 can be a master GPU because it controls display 112. First GPU 104 can be a slave GPU because it does not drive a display. Display 112 can be a variety of different devices that display graphics information such as a computer screen.

First and second GPUs 104 and 106 are coupled to associated memories 108 and 110, respectively. Memories 108 and 110 store information relevant to their associated GPUs. For example, memories 108 and 110 can store surfaces rendered by a GPU, graphics to be displayed on display 112, etc.

An operating system (OS) running on CPU 102 (not shown in FIG. 1) generates configuration cycles that are transmitted to each of first and second GPUs 104 and 106 over bus 114. If either of GPUs 104 and 106 fails to respond to its respective configuration cycle, the OS may execute processes (e.g., plug-and-play) that can cause undesired visual artifacts or a system crash. Thus, even when one of GPUs 104 and 106 is not processing graphics tasks, it can still have to remain powered to respond to configuration cycles. To save power, known methods (e.g., clock gating or power gating) can be used to disable and power down certain portions of the GPU when the GPU is inactive. The known methods, however, can require a substantial amount of the GPU to remain active. Thus, additional power could be saved if the entire GPU, or a substantial portion thereof, is turned off.

In embodiments of the present invention, devices (e.g., GPUs) are provided that have an associated bus interface module. The bus interface module is an independently powered module that can be included in the GPU or can be a physically separate device. When the GPU is transitioned to a "substantially disabled state," the bus interface module remains powered and the rest of the GPU is substantially or completely turned off. The bus interface module is configured to respond to bus configuration cycles when the GPU is in the substantially disabled state so that the operating system running on the CPU does not realize that the GPU has been switched to a substantially disabled state, e.g., so that the operating system does not execute the complex processes mentioned above. In other words, the bus interface module generates a response just as it would if the GPU were in a powered state. In a further embodiment, the bus interface module also controls the power state of the GPU by controlling the output of voltage regulators that are used to supply power signals to the GPU. In another embodiment, another device, e.g., a state management module, controls the power state of the GPU.

Figure 2:
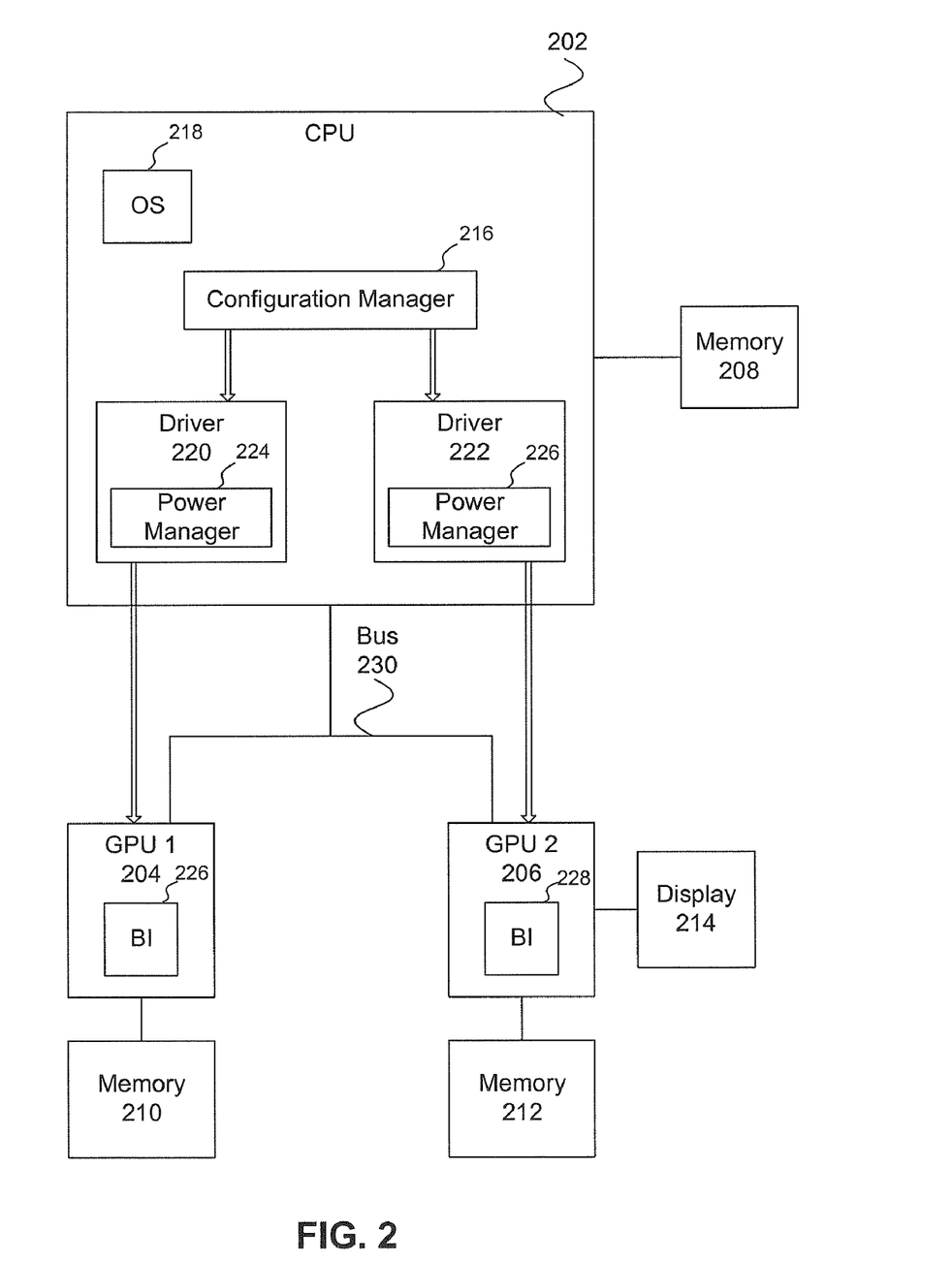
FIG. 2 shows a block diagram of a computing environment, according to an embodiment of the present invention.

FIG. 2 is a block diagram illustration of a computing environment 200 constructed in accordance with the present invention. Computing environment 200 includes a CPU 202, first and second GPUs 204 and 206, memories 208-212, and a display 214.

CPU 202 includes configuration manager 216, operating system (OS) 218, and drivers 220 and 222. Configuration manager 216 receives information about system events and determines a configuration for first and second GPUs 204 and 206 accordingly. By way of example, the system events can include changes in the power source or applications that are graphics intensive (e.g., 3-dimensional games) starting or stopping. A change in power source may be a change from AC power (e.g., wall socket), which is essentially unlimited, to DC power (e.g., battery) which is often limited. In an embodiment, events can result in a change from a single GPU configuration to a multi-GPU configuration or vice-versa. In an alternate embodiment, transitions, e.g., based on application starts or stops, can result in a relatively computationally powerful (and relatively high power consuming) GPU being transitioned to a powered state and a relatively less computationally powerful GPU being transitioned to a substantially disabled state, e.g., in the case of a graphics intensive application starting and vice versa in the case a of a graphics intensive application stopping.

Configuration manager 216 receives information about a system event and determine the configuration for first and second GPUs 204 and 206. The configuration is determined by assigning graphics task responsibilities to each of first and second GPUs 204 and 206. For example, first GPU 204 and/or second GPU 206 can be made available for all graphics processing tasks, only some graphics processing tasks (e.g., only rendering or display), or be inactive (not available for any graphics processing tasks).

OS 218 handles a variety of tasks. For example, OS 218 can supervise the generating of bus configuration cycles that are transmitted to first and second GPUs 204 and 206 over a bus 230. In the illustration of FIG. 2, bus 230 is a PCI Express bus and the bus configuration cycles are PCI configuration cycles.

Driver 220 facilitates interactions with first GPU 204 and driver 222 facilitates interactions with second GPU 206. As shown in FIG. 2, driver 220 includes a power manager module 224 and driver 222 includes a power manager 226. Power manager modules 224 and 226 receive the hardware configuration determination made by configuration manager 216 and determine power states (e.g., powered or substantially disabled) for their respective GPUs 204 and 206. Drivers 220 and 222 also include device-specific modules that are specific to first and second GPUs 204 and 206. These device specific modules can facilitate interactions with a specific device.

CPU 202 is coupled to first and second GPUs 204 and 206 through bus 230. First and second GPUs 204 and 206 can be similar to first and second GPUs 104 and 106 described with reference to FIG. 1 except that first and second GPUs 204 and 206 additionally include bus interface modules 226 and 228, respectively. Bus interface modules 226 and 228 control the power states of first and second GPUs 204 and 206 by controlling voltage regulators that provide power to first and second GPUs 204 and 206. Bus interface modules 226 and 228 also respond to bus configuration cycles. For example, bus interface modules 226 and 228 can be configured to remain powered when first and second GPUs 204 and 206 are switched to a substantially disabled states so that first and second GPUs 204 and 206 can respond to bus configuration cycles. In doing so, first and second GPUs 204 and 206 can be switched to a substantially disabled state and still respond to bus configuration cycles as if they were in powered states.

As shown in FIG. 2, second GPU 206 is coupled to display 214. Thus, second GPU 206 can be a master GPU and first GPU 204 (which is not coupled to a display) can be a slave GPU. First and second GPUs 204 and 206 are coupled to associated memories 210 and 212, respectively. In the exemplary illustration of FIG. 2, memories 210 and 212 are substantially similar to memories 108 and 110, respectively, described above.

Memory 208, associated with CPU 202, stores instructions that are executed on CPU 202 to run configuration manager 216, OS 218, and/or driver 220.

Figure 3:
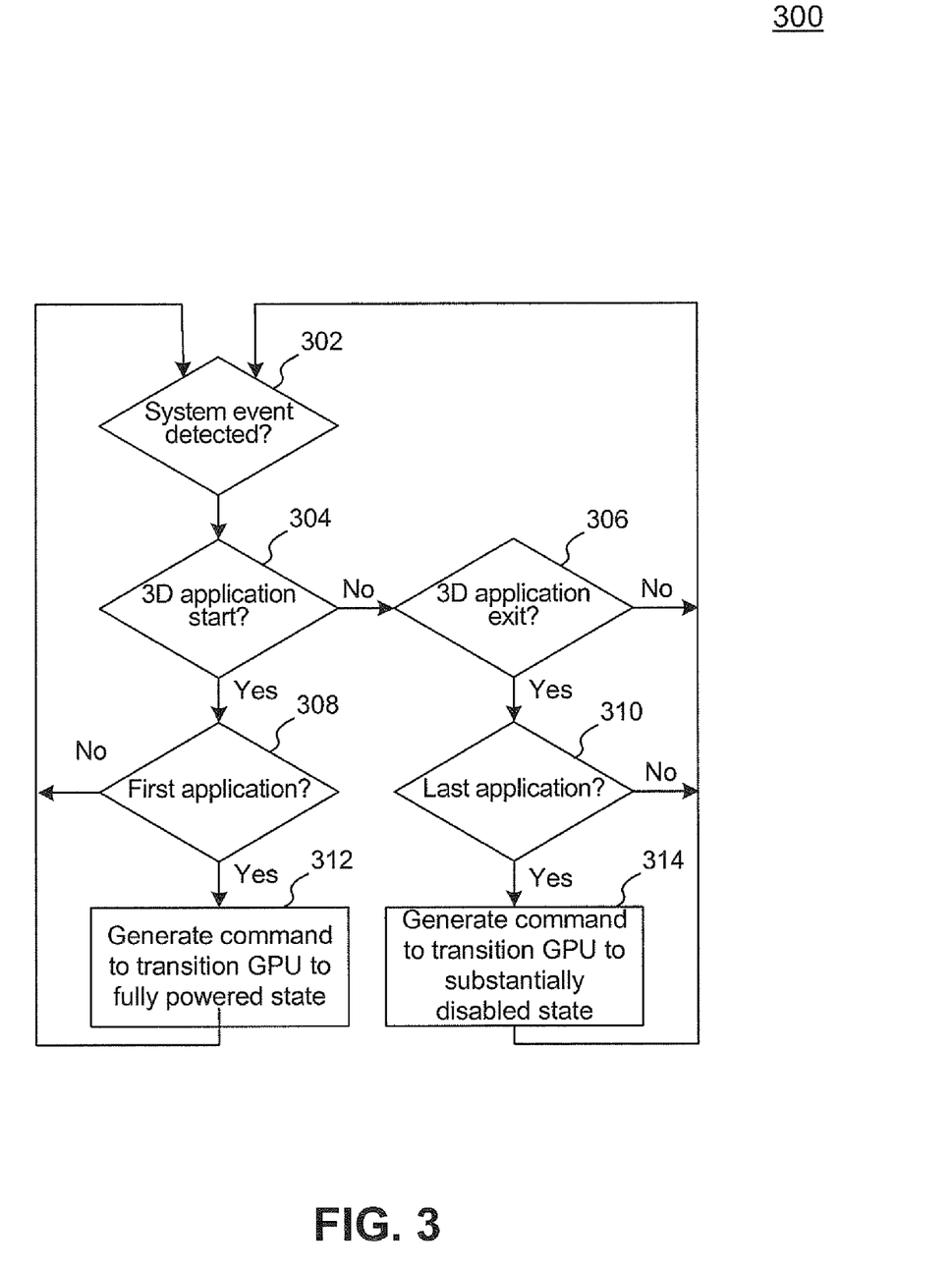
FIG. 3 is a flowchart illustrating an embodiment of the operation of a configuration manager, according to an embodiment of the present invention.

FIG. 3 is an exemplary flowchart 300 illustrating an embodiment of the operation of configuration manager 216 in accordance with the present invention. Other structural and operational embodiments will be apparent to persons skilled in the relevant art(s) based on the following discussion. Flowchart 300 is described with reference to the embodiment of FIG. 2. However, flowchart 300 is not limited to that embodiment. The steps shown in FIG. 3 do not necessarily have to occur in the order shown, and are described in detail below.

In step 302, it is determined whether a system event has been detected. For example, the system event can be the start or stop exit of a 3-D graphics application.

Once a system event has been detected, flowchart 300 proceeds to step 304. In step 304, it is determined whether the system event was the start of a 3-D graphics-intensive application. In step 308, a determination is made as to whether the application is the first 3-D application (or other graphics-intensive application) running on CPU 202. If the application is not the first 3-D application, flowchart 300 returns to step 302. If the 3-D graphics processing application is the first such application, step 312 is reached.

In step 312, a command is generated to transition a GPU, currently in a substantially disabled state, to a powered state. For example, if the application is the first 3-D or other graphics-intensive application, one or more GPUs can be in substantially disabled states when the application is initiated because no application was running that required additional graphics processing capabilities. When the application begins, additional GPUs can be transitioned to powered states to provide additional graphics processing capabilities.

If the system event is not the beginning of a graphics-intensive application, step 306 occurs after step 304. In step 306, it is determined whether the system event was the exit of a 3-D graphics application (or other graphics-intensive application). If the system event is not the exit of a 3-D graphics processing application, flowchart 300 returns to step 302. If the system event is an exit of a 3-D graphics processing application step 310 is reached.

Step 310 determines whether the 3-D application is the last 3-D graphics processing application running on the CPU (e.g., CPU 202). If so, flowchart 300 advances to step 314. In step 314, a command to transition a GPU to a substantially disabled state is generated. For example, if it is determined that the application is a last 3-D application (or other graphics-intensive application) running on CPU 202, then the remaining applications running on CPU 202 do not benefit from or do not require increased graphics performance provided by having multiple GPUs powered at the same time. Thus, one or more GPUs can be transitioned to substantially disabled states to save power.

Flowchart 300 illustrates an embodiment of the operation of configuration manager 216 with regard to system events relating to the start and exit of 3-D graphics or other graphics-intensive applications. As would be appreciated by those skilled in the relevant arts based on the description herein, configuration manager 216 can respond to other types of system events, such as changes in the power supply.

Figure 4:
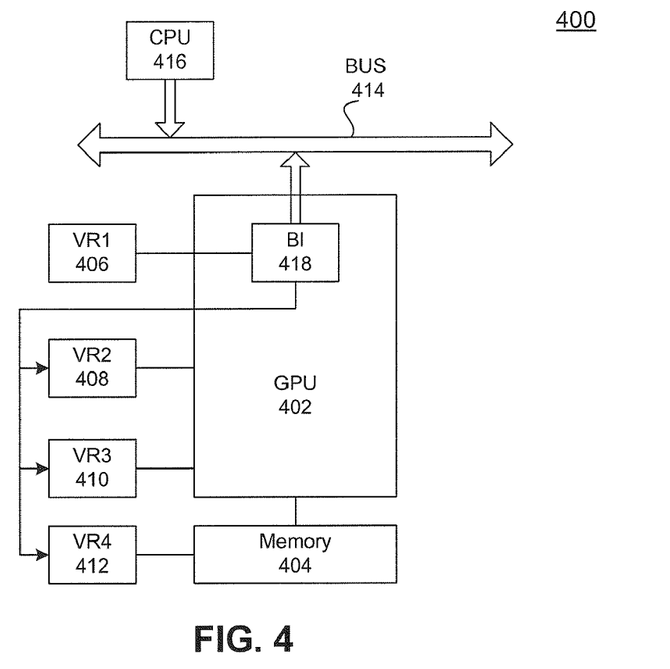
FIGS. 4-10 show block diagrams of computing environments, according to embodiments of the present invention.

FIG. 4 is a block diagram illustration of a computing environment 400, according to an embodiment of the present invention. Computing environment 400 includes a GPU 402, a memory 404, voltage regulators 406-412, a bus 414, and a CPU 416.

GPU 402 can be substantially similar to first GPU 204 and/or second GPU 206 described above. GPU 402 is powered by signals output by voltage regulators 406-410. GPU 402 is coupled to an associated memory 404. Memory 404 can be substantially similar to memory 210 or memory 212, described above, and is powered by a signal output by voltage regulator 412.

Voltage regulators 406-410 power specific circuit blocks that form GPU 402. Voltage regulator 406 is a dedicated voltage regulator that provides power to bus interface module 418. Voltage regulators 408 and 410 provide power to other circuit blocks of GPU 402. For example, voltage regulator 408 and voltage regulator 410 can provide power to a rendering circuit block and a display controller circuit block, respectively, of GPU 402. Bus interface module 418 receives commands from CPU 416 over bus 414 regarding the power state of GPU 402 and controls the outputs of voltage regulators 408-412 based on the command.

Figure 5:
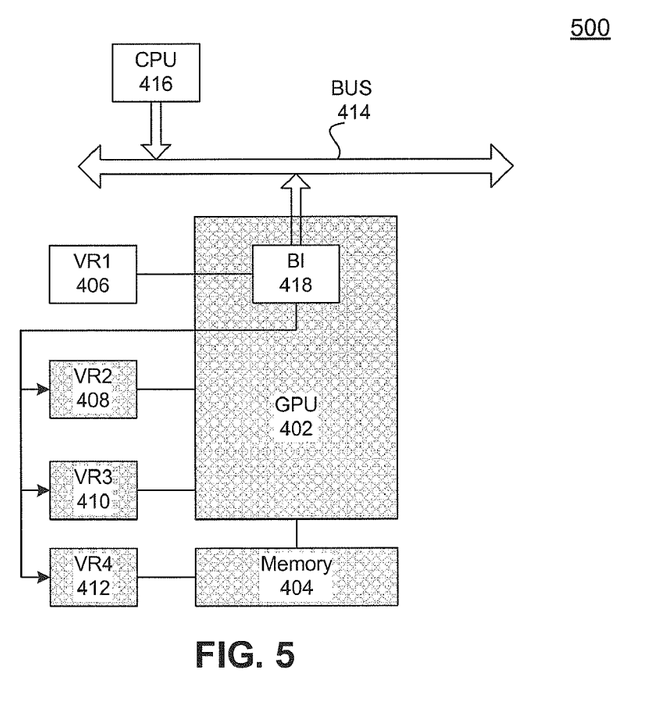

By way of example, FIG. 5 is a block diagram illustration 500 of an alternative computing environment 400 after bus interface module 418 receives a command from CPU 416 to transition GPU 402 to a substantially disabled state. Bus interface module 418 disables the outputs of voltage regulators 408-412 so that substantially all of GPU 402 and associated memory 404 are powered down. As shown in FIG. 5, however, dedicated voltage regulator 406 continues to provide power to bus interface module 418 even when GPU 402 is in the substantially disabled state. In a further embodiment, bus interface module 418 is configured to respond to configuration cycles generated by CPU 416 so that an operating system running on CPU 416 does not execute the complex processes described above. Thus, even while in a substantially disabled state, GPU 402 still generates responses to bus configuration cycles as if it were in a powered state.

Bus interface module 418 uses relatively little power compared to the rest of GPU 402. Keeping bus interface module 416 powered even when GPU 402 is in a substantially disabled state, then, does not significantly detract from the total possible power savings.

Figure 6:
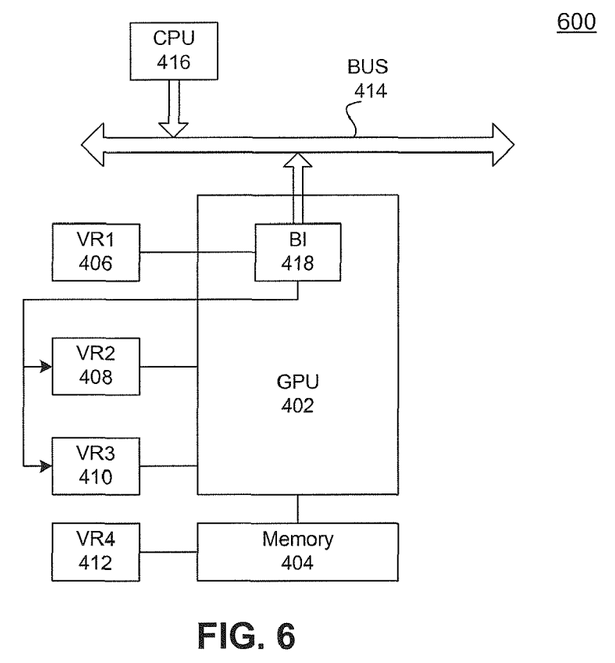

FIG. 6 is a block diagram illustration of a computing environment 600, according to an embodiment of the present invention. Computing environment 600 is substantially similar to computing environment 400 shown in FIGS. 4 and 5. In the illustration of FIG. 6, however, bus interface module 418 only controls the outputs of voltage regulators 408 and 410 rather than voltage regulators 408-412 as in computing environment 400.

Figure 7:
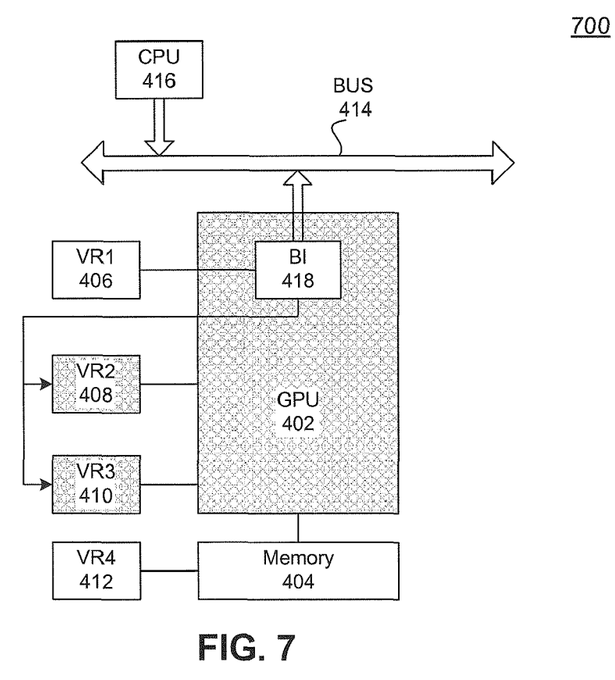

FIG. 7 is a block diagram illustration of computing environment 600 after bus interface module 418 receives command to transition GPU 402 to a low power state. In FIG. 7, only GPU 402 is transitioned to a substantially disabled state by disabling the outputs of voltage regulators 408 and 410. Since bus interface module 418 is not coupled to voltage regulator 412, memory 404 remains powered when GPU 402 is in a substantially disabled state. In such a manner, memory contents are retained while GPU 402 is in a substantially disabled state. In a further embodiment, more power can be saved by switching the memory module to the self-refresh mode.

Figure 8:
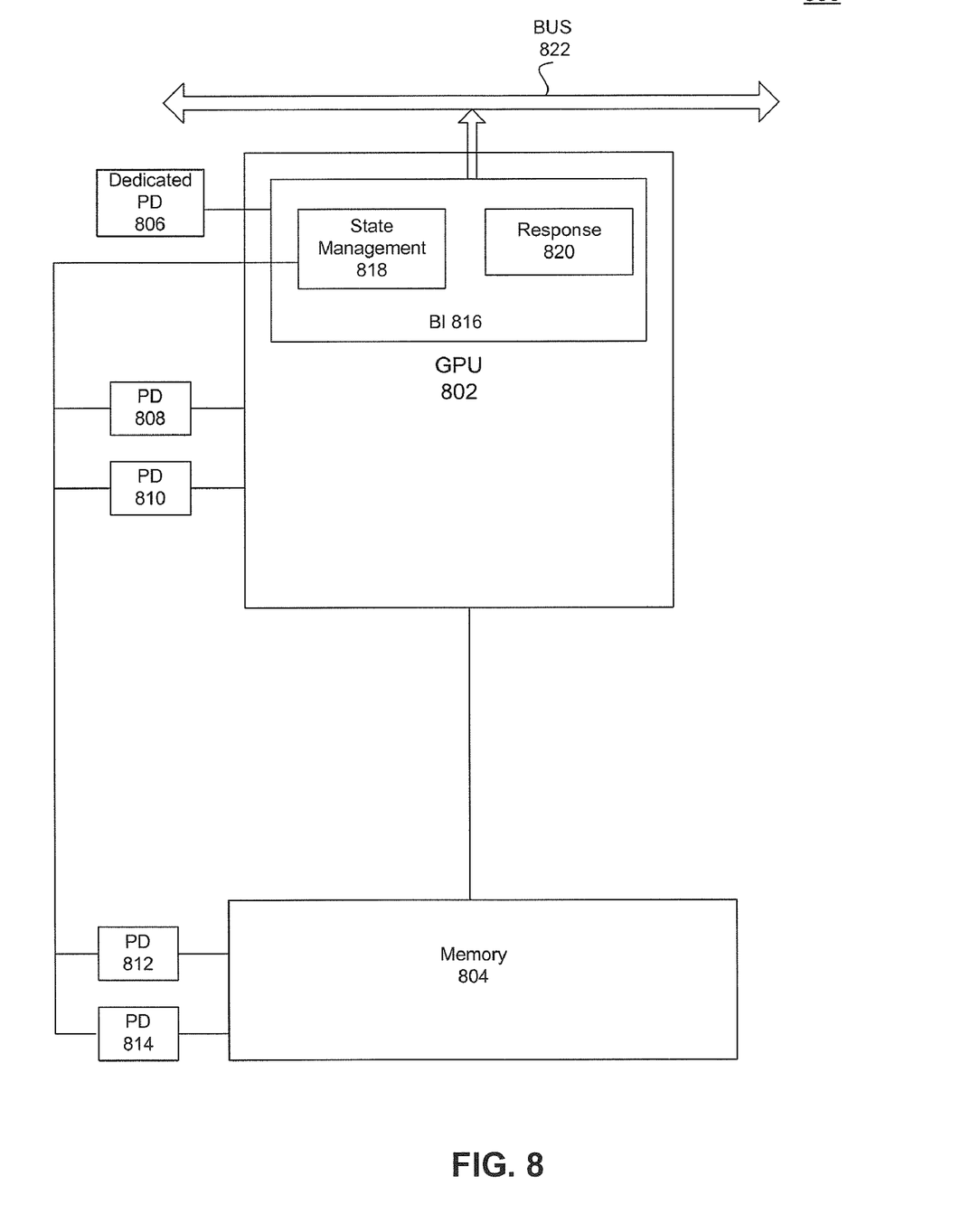

FIG. 8 is a block diagram illustration of a computing environment 800, according to an embodiment of the present invention. Computing environment 800 includes a GPU 802, a memory 804, a dedicated power device 806, power devices 808-814, and a bus 822. GPU 802 includes a bus interface module 816. Bus interface module 816 includes a state management module 818 and a response module 820.

Power devices 806-814 can be any type of device that provides a signal to power portions of GPU 802 and/or memory 804. For example, power devices 806-814 can include voltage regulators and/or current sources. As shown in FIG. 8, power devices 808 and 810 provide power to GPU 802. In other embodiments, any number of power devices can be used to provide power to aspects of GPU 802. For example, a power device may be provided for each type of circuit block that makes up GPU 802. Power devices 812 and 814 provide power to memory 804. In alternate embodiments, any number of power devices can be used to power memory 804.

For example, different power devices can be used to provide power to different portions of memory 804. Increasing the number of voltage regulators coupled to GPU 802 or memory 804 increases the number of circuit blocks within each element that can be independently powered. Dedicated power device 806 provides power to bus interface module 816. In an embodiment, dedicated power device 806 continues to provide power to bus interface module 816 even when GPU 802 and/or memory 804 are transitioned to substantially disabled states.

State management module 818 receives commands from a CPU (not shown) coupled to bus 822 and controls the outputs of power devices 808-814 to control the power states of GPU 802 and/or memory 804. In particular, based on the command received from the CPU, state management module 818 decides which of the power devices are to output a power signal and which of the power devices will have their outputs disabled, and thus disabling the circuit blocks to which those power devices are coupled.

Response module 820 receives bus configuration cycles generated by the CPU and generates appropriate responses. The responses are transmitted to the CPU so that the OS running on the CPU does not realize that GPU 802, and/or memory 804, has been transitioned to a substantially disabled state. For example, bus 822 can be a PCI Express bus and the bus configuration cycles can be PCI configuration cycles. In such an embodiment, response module 820 is configured to respond to PCI configuration cycles when GPU 802 is in a substantially disabled state or partially powered state similar to as it would if GPU 802 was in a powered state. Thus, the CPU will not execute the complex processes leading to negative effects described above.

Figure 9:
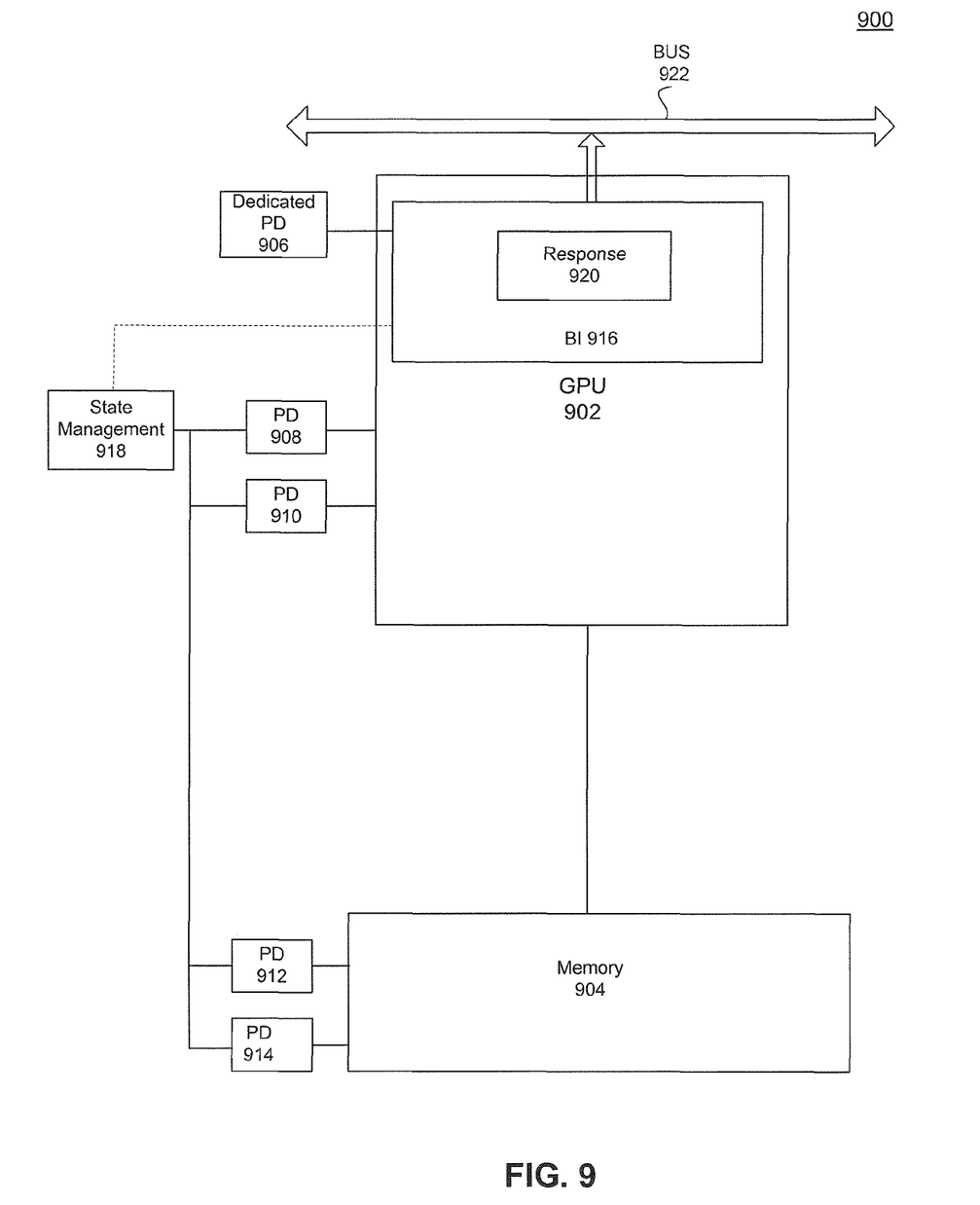

FIG. 9 is a block diagram illustration of a computing environment 900, according to an embodiment of the present invention. Computing environment 900 includes a GPU 902, a memory 904, a dedicated power device 906, power devices 908-914, and bus 822. GPU 902 includes a bus interface (BI) module 916. Bus interface module 916 includes a response module 920. Computing environment 900 is substantially similar to computing environment 800 except that BI module 916 does not control the power states of GPU 902 and memory 904. Rather, another device, i.e., state management module 918, is used to control the power states of GPU 902 and memory 904.

In an embodiment, GPU 902 responds to bus configuration cycles when it is a powered state. However, when GPU 902 transitions to a substantially disabled state, BI module 906, instead of GPU 902, responds to the bus configuration cycles. As shown in FIG. 9, BI module 906 can be coupled to state management module 918 so that BI module 906 is made aware of the power state of GPU 902. Thus, BI module 906 can determine when to respond to bus configuration cycles and when to pass the bus configuration cycles depending on the power state of GPU 902.

Figure 10:
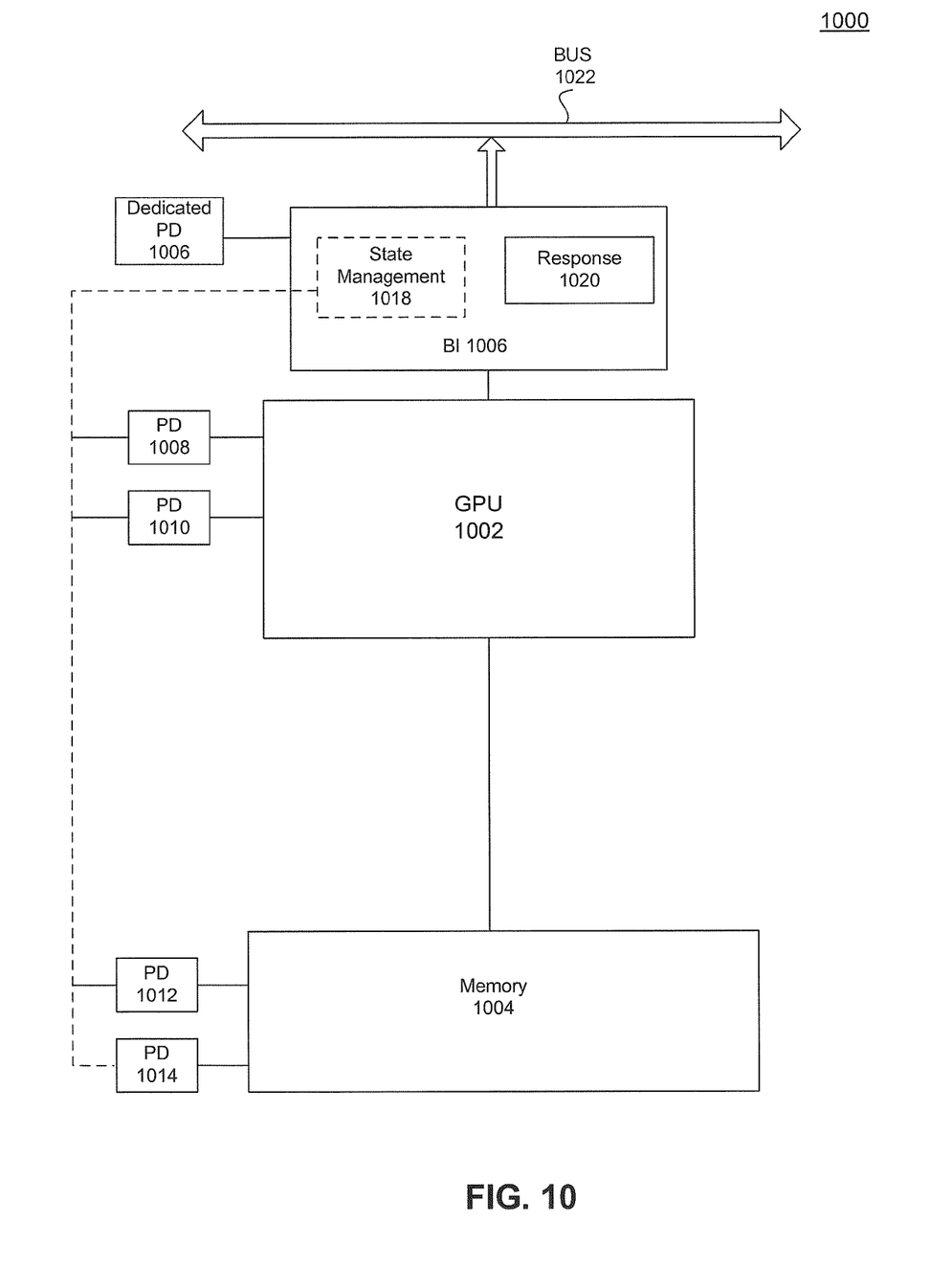

FIG. 10 is a block diagram illustration of a computing environment 1006, according to an embodiment of the present invention. Computing environment 1000 includes a GPU 1002, a memory 1004, a dedicated power device 1006, power devices 1008-1014, and bus 822. GPU 1002 includes a bus interface (BI) module 1016. Bus interface module 916 includes a state management module 1018 and a response module 1020. State management module 1018 may be implemented in BI module 1016 (as in computing environment 800) or as a separate device (as in computing environment 900). Computing environment 1000 is substantially similar to computing environment 800 except that BI module 1016 is implemented as a device separate from GPU 1002. For example, BI module 1016 can be a different device formed on the same printed circuit board or substrate as GPU 1002 and coupled to GPU 1002 using traces. Alternatively, BI module 1006 can be a separate device coupled to GPU 1002 using another device (e.g., a motherboard).

Figure 11:
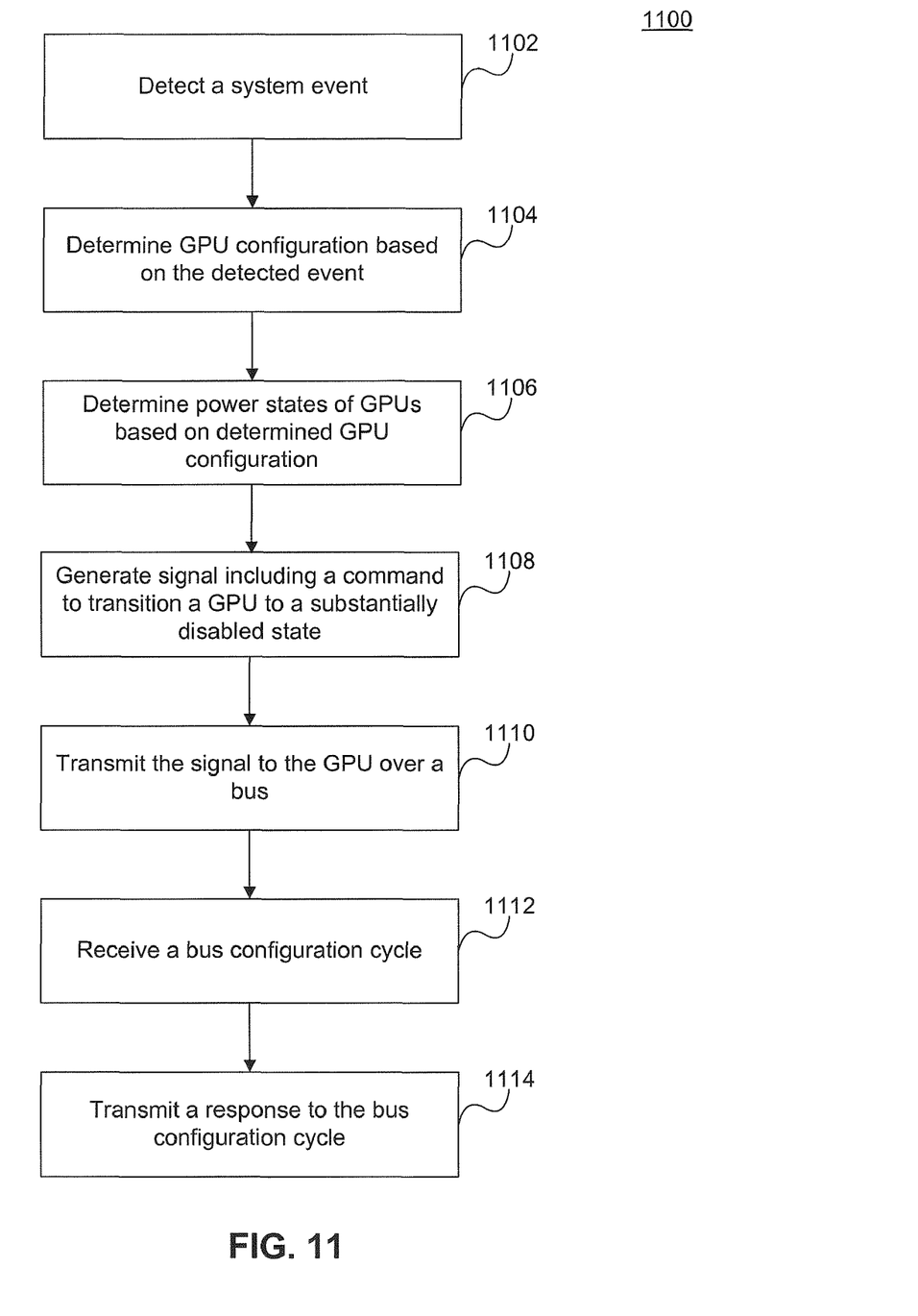
FIG. 11 is a flowchart illustrating a method managing devices exemplified in this embodiment as GPUs, according to an embodiment of the present invention.

FIG. 11 is a flowchart of an exemplary method 1100 for managing devices (e.g., GPUs), according to an embodiment of the present invention. Other structural and operational embodiments will be apparent to persons skilled in the relevant art(s) based on the following discussion. Flowchart 1100 is described with reference to the embodiment of FIG. 2. However, flowchart 1100 is not limited to that embodiment. The steps shown in FIG. 11 do not necessarily have to occur in the order shown, and are described in detail below.

In step 1102, a system event is detected. For example, in FIG. 2, configuration manager 216 can receive information regarding a system event. For example, the system event may be a change in the power source or the start or exit of a graphics intensive application.

In step 1104, a GPU configuration is determined based on the detected event. For example, configuration manager 216 determines responsibilities for each of first GPU 204 and second GPU 206 based on the detected system event. In this example, configuration manager 216 determines that an application requiring or benefiting from addition graphics processing power has been exited. Thus, configuration manager 216 determine that first GPU 204 should not be available to process graphics processing tasks.

In step 1106, the power states of the GPUs are determined based on the determined GPU configuration. For example, in FIG. 2, power manager module 224 of driver 220 receives the determined GPU configuration and determines power states for each of first GPU 204 and second GPU 206. Power manager module 224 receives a configuration determined by configuration manager 216 specifying that first GPU 204 is not available to handle graphics processing tasks. Accordingly, power manager 224 determines that first GPU 204 should be in a substantially disabled state.

In step 1108, a signal is generated that includes command to transition a GPU to a substantially disabled state. For example, FIG. 2, driver 220 generates a command to transition first GPU 204 to a substantially disabled state. In step 910, the generated signal is transmitted to the GPU over a bus. For example, in FIG. 2, the generated signal is transmitted to first GPU 204 over bus 230.

In step 1112, a bus configuration cycle is received by the GPU. For example, a PCI bus configuration cycle can be transmitted to a first GPU 204 over bus 230. In step 1114, a response to the bus configuration cycle is transmitted. For example, in FIG. 2, CPU 202 can receive a response to the bus configuration cycle from first GPU 204. Even though first GPU 204 is in a substantially disabled state, it still generates an appropriate response to the bus configuration cycle. Specifically, bus interface module 226 of first GPU 204, which remains powered even in a substantially disabled state, generates an appropriate response to the bus configuration cycle. Thus, OS 218 running on CPU 202 does not realize that first GPU 204 has been transitioned to a substantially disabled state. In such a manner, undesired visual artifacts or the system crashes associated with the OS 218 determining that first GPU 204 has been switched to a substantially disabled state can be avoided.

Figure 12:
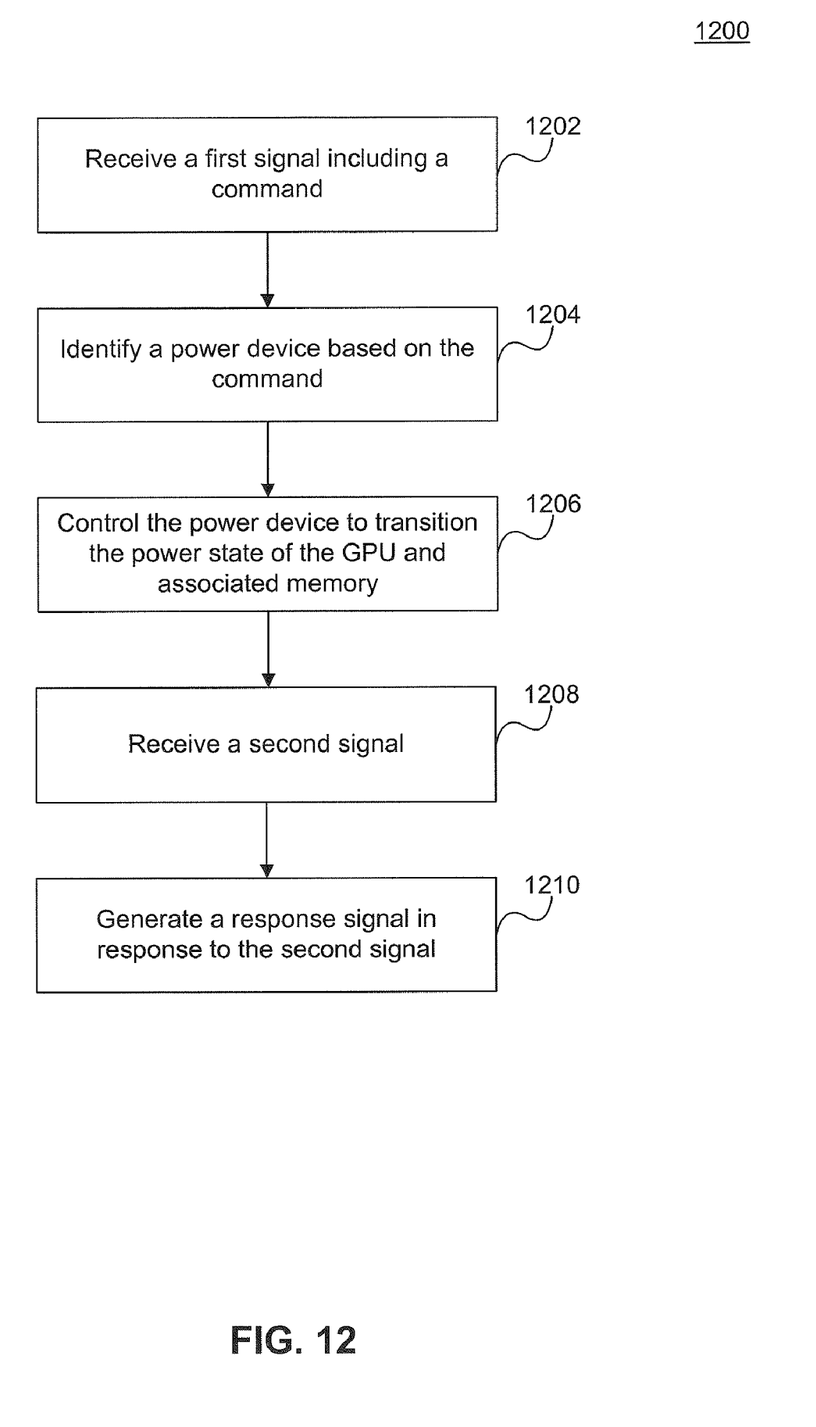
FIG. 12 is a flowchart illustrating a method of operating a device exemplified in this embodiment as a GPU, according to an embodiment of the present invention.

FIG. 12 is a flowchart of an exemplary method 1200 of operating a GPU, according to an embodiment of the present invention. Other structural and operational embodiments will be apparent to persons skilled in the relevant art(s) based on the following discussion. Flowchart 1200 is described with reference to the embodiment of FIG. 8. However, flowchart 1200 is not limited to that embodiment. The steps shown in FIG. 12 do not necessarily have to occur in the order shown. The steps of FIG. 12 are described in detail below.

In step 1202, a first signal including a command to transition the power state of the GPU is received. For example, in FIG. 8 GPU 802 can receive a signal including a command to transition GPU 802 to a substantially disabled state or a partially powered state from a CPU over bus 822.

In step 1204, a power device is identified based on the command. In FIG. 8, state management module 818 can identify one or more of power devices 808-814 based on the command. For example, state management module 818, based on the command, can determine which portions of GPU 802 and/or memory 804 are to be disabled. Based on this determination, state management module 818 can identify power devices that supply power to those portions of GPU 802 and/or memory 804 as being power devices that should have their outputs disabled. For example, power device 808 can be coupled to a rendering engine of GPU 802 and power device 810 can be coupled to a display controller of GPU 802. Having determined that the rendering engine and/or display controller of GPU 802 should be disabled, state management module 818 identifies the corresponding power device.

In step 1206, the identified power device is controlled to transition the GPU to a substantially disabled state or a partially powered state. For example, in FIG. 8, state management module 818 controls the output of the power devices identified in step 1006 to transition GPU 802 and associated memory 804 to power states specified in the received command.

In step 1208, a second signal is received. For example, in FIG. 8, GPU 802 can receive a bus configuration cycle transmitted by a CPU over bus 822. The bus configuration cycle can be a PCI configuration cycle.

In step 1210, a response signal is generated in response to the second received signal. For example, in FIG. 8, response module 820 of bus interface module 816 can generate an appropriate response to the received bus configuration cycle. Because dedicated voltage regulator 806 continues to provide power to bus interface module 816, even when GPU 802 is in a substantially disabled state, response module 820 is able to generate appropriate responses to bus configuration cycles even when GPU 802 is in a substantially disabled state or partially powered state.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of operating a first device, comprising:
   identifying, in response to a first signal received from a second device, a power device of a plurality of power devices, wherein the first device is coupled to the plurality of power devices;
   transitioning the first device to a substantially disabled state in response to the first signal, wherein the transitioning disables an output of the identified power device; and
   generating a first response signal in response to a second signal received from the second device while the first device is in the substantially disabled state;
   wherein the first response signal is substantially similar to a second response signal that is generated by the first device in response to the second signal when the first device is in a powered state, and
   wherein the second signal is transmitted by the second device to each device of a plurality of devices, the plurality of devices including the first device.

2. The method of claim 1, wherein the second device is a central processing unit (CPU).

3. The method of claim 1, wherein the second signal comprises a bus configuration cycle.

4. The method of claim 1, wherein the transitioning comprises:
   disabling an output voltage of the identified power device coupled to the first device.

5. The method of claim 4, wherein the power device is coupled to at least one of a rendering engine or a display controller of the first device.

6. The method of claim 1, further comprising:
   disabling at least a portion of a memory associated with the first device.

7. The method of claim 6, wherein the disabling at least a portion of a memory comprises:
   disabling an output voltage of the identified power device coupled to the memory.

8. The method of claim 1, wherein the first response signal prevents the second device from executing a process.

9. The method of claim 1, wherein the first device comprises a rendering engine.

10. A device, comprising:
a bus interface module, comprising:
a state management module configured to transition the device to a low power state in response to a first signal received from another device; and
a response module configured to generate a first response signal in response to a second signal received from the other device while the device is in the low power state,
wherein the first response signal is substantially similar to a second response signal that is generated by the device in response to the second signal when the device is in a powered state; and
wherein the second signal is transmitted by the another device to each device of a plurality of devices, the plurality of devices including the device,
wherein the bus interface module is coupled to a power system, the power system being configured to supply power to the bus interface module when the device is in the low power state.

11. The device of claim 10, wherein the bus interface module is coupled to a power device that is coupled to the device, wherein the state management module is configured to control an output of the power device.

12. The device of claim 11, further comprising a rendering engine, wherein the power device is coupled to the rendering engine.

13. The device of claim 10, wherein:
the bus interface module is coupled to a power device that is coupled to a memory associated with the device, and
the state management module is configured to control a power state of the memory by controlling an output of the power device.

14. The device of claim 10, wherein:
the another device comprises a central processing unit (CPU),
the device is coupled to the CPU over a bus, and
the first signal is a bus configuration cycle.

15. A non-transitory computer readable medium carrying one or more sequences of one or more instructions for execution by one or more processors to perform a method for operating a first device, the instructions when executed by the one or more processors, cause the one or more processors to:
identifying, in response to a first signal received from a second device, a power device of a plurality of power devices, wherein the first device is coupled to the plurality of power devices;
transitioning the first device to a substantially disabled state in response to the first signal, wherein the transitioning disables an output of the identified power device; and
generate a first response signal in response to a second signal received from the second device while the first device is in the substantially disabled state;
wherein the first response signal is substantially similar to a second response signal that is generated by the first device in response to the second signal when the first device is in a powered state, and
wherein the second signal is transmitted by the second device to each device of a plurality of devices, the plurality of devices including the first device.

16. The computer readable medium of claim 15, wherein the second device is a central processing unit (CPU).

17. The computer readable medium of claim 15, wherein the second signal comprises a bus configuration cycle.

18. The computer readable medium of claim 15, wherein the power device is coupled to at least one of a rendering engine or a display controller of the first device.

19. The computer readable medium of claim 15, wherein the transitioning comprises:
disabling an output voltage of the identified power device coupled to the first device.

20. The computer readable medium of claim 15, further comprising:
disabling at least a portion of a memory associated with the first device.

21. A method of operating a first device, comprising:
identifying, in response to a first signal received from a second device, a power device of a plurality of power devices, wherein the first device is coupled to the plurality of power devices;
transitioning the first device to a substantially disabled state in response to the first signal, wherein the transitioning disables an output of the identified power device, and wherein the second device being configured to execute a program, such that operation of the first device is based on execution of the program; and
generating a first response signal in response to a second signal received from the second device while the first device is in the substantially disabled state;
wherein the first response signal is substantially similar to a second response signal that is generated by the first device in response to the second signal when the first device is in a powered state, whereby the program continues to execute.

* * * * *

UNITED STATES PATENT AND TRADEMARK OFFICE
CERTIFICATE OF CORRECTION

PATENT NO. : 8,316,255 B2  
APPLICATION NO. : 12/713935  
DATED : November 20, 2012  
INVENTOR(S) : Khodorkovsky et al.

Page 1 of 1

It is certified that error appears in the above-identified patent and that said Letters Patent is hereby corrected as shown below:

Title Page
Item (73), please add --Advanced Micro Devices, Inc., Sunnyvale, CA (US)--.

Column 11
Line 12, please replace "other device" with --another device--.

Signed and Sealed this  
Second Day of April, 2013

Teresa Stanek Rea  
*Acting Director of the United States Patent and Trademark Office*